US012065116B2

(12) United States Patent
Miranda et al.

(10) Patent No.: US 12,065,116 B2
(45) Date of Patent: Aug. 20, 2024

(54) CONTROL EQUIPMENT CAPABLE OF CONTROLLING THE BRAKING OF AN AUTONOMOUS VEHICLE AND ASSOCIATED VEHICLE

(71) Applicant: TRANSDEV GROUP INNOVATION, Issy-les-Moulineaux (FR)

(72) Inventors: Paulo Miranda, Voisins le Bretonneux (FR); Nicolas Desmoineaux, Courbevoie (FR); Laurent Vallot, Chartres (FR); Aurélien Gaget, Chatenay Malabry (FR); Laurianne Choquet, Rueil Malmaison (FR)

(73) Assignee: Transdev Group Innovation, Issy-les-Moulineaux (FR)

( * ) Notice: Subject to any disclaimer, the term of this patent is extended or adjusted under 35 U.S.C. 154(b) by 108 days.

(21) Appl. No.: 17/580,452

(22) Filed: Jan. 20, 2022

(65) Prior Publication Data

US 2022/0234552 A1    Jul. 28, 2022

(30) Foreign Application Priority Data

Jan. 22, 2021  (FR) ..................................... 21 00612

(51) Int. Cl.
*B60T 7/12*     (2006.01)
*B60T 13/68*    (2006.01)
(Continued)

(52) U.S. Cl.
CPC ............. *B60T 7/12* (2013.01); *B60T 13/686* (2013.01); *B60T 13/745* (2013.01);
(Continued)

(58) Field of Classification Search
CPC ........ B60T 7/12; B60T 13/686; B60T 13/745; B60T 17/221; B60T 17/227;
(Continued)

(56) References Cited

U.S. PATENT DOCUMENTS

| 5,457,632 A * | 10/1995 | Tagawa ..................... B62D 6/04 |
| | | 701/43 |
| 2005/0209751 A1* | 9/2005 | Kato ....................... B62D 6/003 |
| | | 701/41 |

(Continued)

FOREIGN PATENT DOCUMENTS

| DE | 10 2018 002 990 A1 | 10/2019 |
| FR | 3073478 A1 | 5/2019 |
| JP | 2020-183221 A | 11/2020 |

OTHER PUBLICATIONS

French Search Report issued in the counterpart French Patent Application No. 2100612, dated Sep. 15, 2021 in 2 pages.

*Primary Examiner* — Phutthiwat Wongwian
*Assistant Examiner* — Susan E Scharpf
(74) *Attorney, Agent, or Firm* — Knobbe, Martens, Olson & Bear, LLP

(57) ABSTRACT

Control equipment is capable of controlling braking of an autonomous motor vehicle that includes at least one wheel. The control equipment includes a braking system, which includes at least a hydraulic circuit and a brake able to apply a braking force on the wheel as a function of a hydraulic pressure present in the hydraulic circuit. The control equipment also includes a primary controller configured to determine a braking setpoint, a primary actuator able to generate hydraulic pressure as a function of the braking setpoint when the primary actuator receives the braking setpoint, an external sensor configured to transmit an external measurement signal to the primary controller, and an auxiliary actuator able to generate the hydraulic pressure as a substitute for the primary actuator.

12 Claims, 2 Drawing Sheets

(51) Int. Cl.
   *B60T 13/74*      (2006.01)
   *B60T 17/22*      (2006.01)
   *B60W 10/188*     (2012.01)
   *B60W 60/00*      (2020.01)
   *B62D 6/00*       (2006.01)

(52) U.S. Cl.
   CPC .......... *B60T 17/221* (2013.01); *B60T 17/227* (2013.01); *B60W 10/188* (2013.01); *B62D 6/002* (2013.01); *B60T 2270/402* (2013.01); *B60T 2270/413* (2013.01); *B60W 60/00186* (2020.02)

(58) Field of Classification Search
   CPC ........ B60T 2270/402; B60T 2270/413; B60W 10/188; B60W 60/00186; B62D 6/002
   See application file for complete search history.

(56) References Cited

U.S. PATENT DOCUMENTS

| | | | |
|---|---|---|---|
| 2010/0324766 A1* | 12/2010 | Linda | B60W 40/076 701/22 |
| 2013/0328277 A1* | 12/2013 | Ryan | B60G 17/0165 280/5.519 |
| 2016/0214582 A1* | 7/2016 | Brenn | B60T 7/042 |
| 2017/0282877 A1* | 10/2017 | Besier | B60T 8/885 |
| 2018/0086208 A1* | 3/2018 | Hodgson | B60L 3/104 |
| 2018/0273045 A1* | 9/2018 | Herrera | B60W 40/11 |
| 2019/0054826 A1* | 2/2019 | Greenwood | B60L 3/102 |
| 2021/0179051 A1* | 6/2021 | Alford | B60T 13/142 |

\* cited by examiner

CONTROL EQUIPMENT CAPABLE OF CONTROLLING THE BRAKING OF AN AUTONOMOUS VEHICLE AND ASSOCIATED VEHICLE

CROSS-REFERENCE TO RELATED APPLICATIONS

This application is a U.S. non-provisional application claiming the benefit of French Application No. 21 00612, filed on Jan. 22, 2021, which is incorporated herein by reference in its entirety.

FIELD

The present invention relates to control equipment capable of controlling braking of an autonomous motor vehicle.

The present invention also relates to an autonomous motor vehicle integrating such control equipment.

The invention relates to the field of the automatic driving of motor vehicles, in particular safety in the driving of such vehicles.

BACKGROUND

To be able to travel with complete autonomy while carrying passengers, an autonomous motor vehicle must meet strict safety requirements. In particular, the vehicle must be capable of detecting an operating failure so as to be able to secure the vehicle.

These requirements are particularly high regarding the braking of the vehicle. In particular, the safety requirements are such that it is generally not possible to use sensors and actuators of the "commercial off-the-shelf" (COTS) type. In fact, although such COTS products are easy to obtain and inexpensive, they generally do not make it possible to meet the required safety level. Furthermore, these are proprietary products that it is therefore not easy to monitor.

Thus, to date, to achieve the necessary safety level, developing an autonomous motor vehicle requires developing specific sensors and actuators allowing the proper operation thereof to be monitored. This remains complex and costly.

Furthermore, any change made to the vehicle, for example its size, its maximum payload, etc., may require changes to the sensors and actuators, which must then be completely redeveloped so as to continue to meet the safety requirements.

SUMMARY

One aim of the present invention is to address this issue, in particular by proposing control equipment built around COTS components while respecting the required safety levels.

To this end, the present invention relates to control equipment capable of controlling braking of an autonomous motor vehicle, the vehicle including at least one wheel, the control equipment comprising:
  braking system comprising at least a hydraulic circuit and a brake able to apply a braking force on the wheel as a function of a hydraulic pressure present in the hydraulic circuit;
  a primary controller, configured to determine a braking setpoint,
  a primary actuator, able to generate said hydraulic pressure as a function of the braking setpoint when said primary actuator receives said braking setpoint, the primary actuator comprising an internal sensor configured to transmit, to the primary controller, an internal measurement signal corresponding to a measurement of the hydraulic pressure generated by the primary actuator;
  an external sensor configured to transmit, to the primary controller, an external measurement signal corresponding to a measurement of the hydraulic pressure in the hydraulic circuit; and
  an auxiliary actuator, able to generate, as a substitute for the primary actuator, said hydraulic pressure as a function of the braking setpoint when said auxiliary actuator receives said braking setpoint,
  the primary controller being configured to determine a first error value corresponding to the difference between a hydraulic pressure corresponding to the braking setpoint and the internal measurement signal, and to determine a second error value corresponding to the difference between the internal measurement signal and the external measurement signal,
  the primary controller being configured to transmit the braking setpoint to the auxiliary actuator when the first error value is above a first error threshold and/or when the second error value is above a second error threshold.

In particular, the primary controller is configured to transmit the braking setpoint to the auxiliary actuator either when the first error value is above a first error threshold or when the second error value is above a second error threshold.

According to other advantageous aspects of the invention, the control equipment comprises one or more of the following features, considered alone or according to all technically possible configurations:
  the primary actuator comprises an internal inertial measurement unit (IMU), which is configured to transmit, to the primary controller, a first acceleration signal corresponding to an internal measurement of an instantaneous acceleration of the vehicle,
  the control equipment further comprising an external IMU, independent of the primary actuator and configured to transmit, to the primary controller, a second acceleration signal corresponding to an external measurement of an instantaneous acceleration of the vehicle;
  the primary controller is configured to calculate an estimated acceleration of the vehicle as a function of the braking setpoint and of the weight of the vehicle and of the instantaneous incline of the vehicle, and to compare the first acceleration signal and/or the second acceleration signal with the estimated acceleration;
  the control equipment further comprises an electric traction motor able to apply instantaneous drive and/or braking torque to the wheel, the traction motor comprising a torque sensor of said motor configured to transmit a measurement signal of the instantaneous torque to the primary controller, the primary controller being configured to calculate the estimated acceleration further as a function of the measurement signal of the torque;
  the primary controller is configured to compare the first acceleration signal and/or the second acceleration signal with a maximum braking threshold, and to trigger securing of the vehicle by sending the corresponding braking setpoint to the auxiliary actuator when the first acceleration signal and/or the second acceleration signal is above the maximum braking threshold;

the control equipment further comprises an auxiliary controller, configured to determine an auxiliary braking setpoint when the braking setpoint determined by the primary controller is above a setpoint threshold, the primary actuator or the auxiliary actuator being configured to generate the hydraulic pressure as a function of the auxiliary braking setpoint instead of the braking setpoint;

the control equipment further comprises a primary automatic pilot system configured to generate a braking command as a function of a trajectory assigned to the vehicle, and to transmit the braking command to the primary controller, respectively to the auxiliary controller, the primary controller, respectively the auxiliary controller, determining the braking setpoint from the braking command;

the control equipment further comprises an auxiliary automatic pilot system configured to determine an auxiliary braking command and to transmit the auxiliary braking command to the primary controller, respectively to the auxiliary controller, the primary controller, respectively the auxiliary controller, determining the braking setpoint from the auxiliary braking command;

the primary controller is able to take the auxiliary braking command into account in place of the braking command, when the braking command is above an automatic pilot threshold;

the control equipment further comprises at least one manual pilot device for generating a manual braking command, the primary controller being able to develop the braking setpoint from the manual braking command instead of the braking command or the auxiliary braking command;

the manual pilot device is further configured to generate a manual stop command, the control equipment further comprising a second auxiliary actuator configured to trigger emergency braking of the vehicle by generating a predetermined hydraulic pressure in the hydraulic circuit upon receiving the manual stop command;

the control equipment, further capable of controlling a steering lock angle of the vehicle, the vehicle including at least one steering wheel, the primary controller further being configured to determine a steering setpoint, the control equipment further comprising:

a primary steering actuator configured to impart a steering lock angle to the steering wheel of the vehicle as a function of the steering setpoint when said primary steering actuator receives said steering setpoint, the primary steering actuator comprising an internal steering sensor configured to transmit, to the primary controller, an internal steering signal corresponding to a measurement of the steering angle imparted by the primary steering actuator;

an external steering sensor configured to transmit, to the primary controller, an external steering signal corresponding to a measurement of the steering lock angle of the steering wheel;

an auxiliary steering actuator, configured to impart a steering lock angle to the steering wheel of the vehicle when said auxiliary steering actuator receives said steering setpoint;

the primary controller being configured to determine a first steering value corresponding to the difference between the steering setpoint and the internal steering signal, and configured to determine a second steering value corresponding to the difference between the internal steering signal and the external steering signal, the primary controller being configured to transmit the steering setpoint to the auxiliary steering actuator when the first steering value is above a first steering threshold and/or when the second steering value is above a second steering threshold.

The invention also relates to an autonomous motor vehicle incorporating control equipment as described above.

BRIEF DESCRIPTION OF THE DRAWINGS

These features and advantages of the invention will appear more clearly upon reading the following description, provided solely as a non-limiting example, and done in reference to the appended drawing, in which.

DETAILED DESCRIPTION

System

Figure 1:
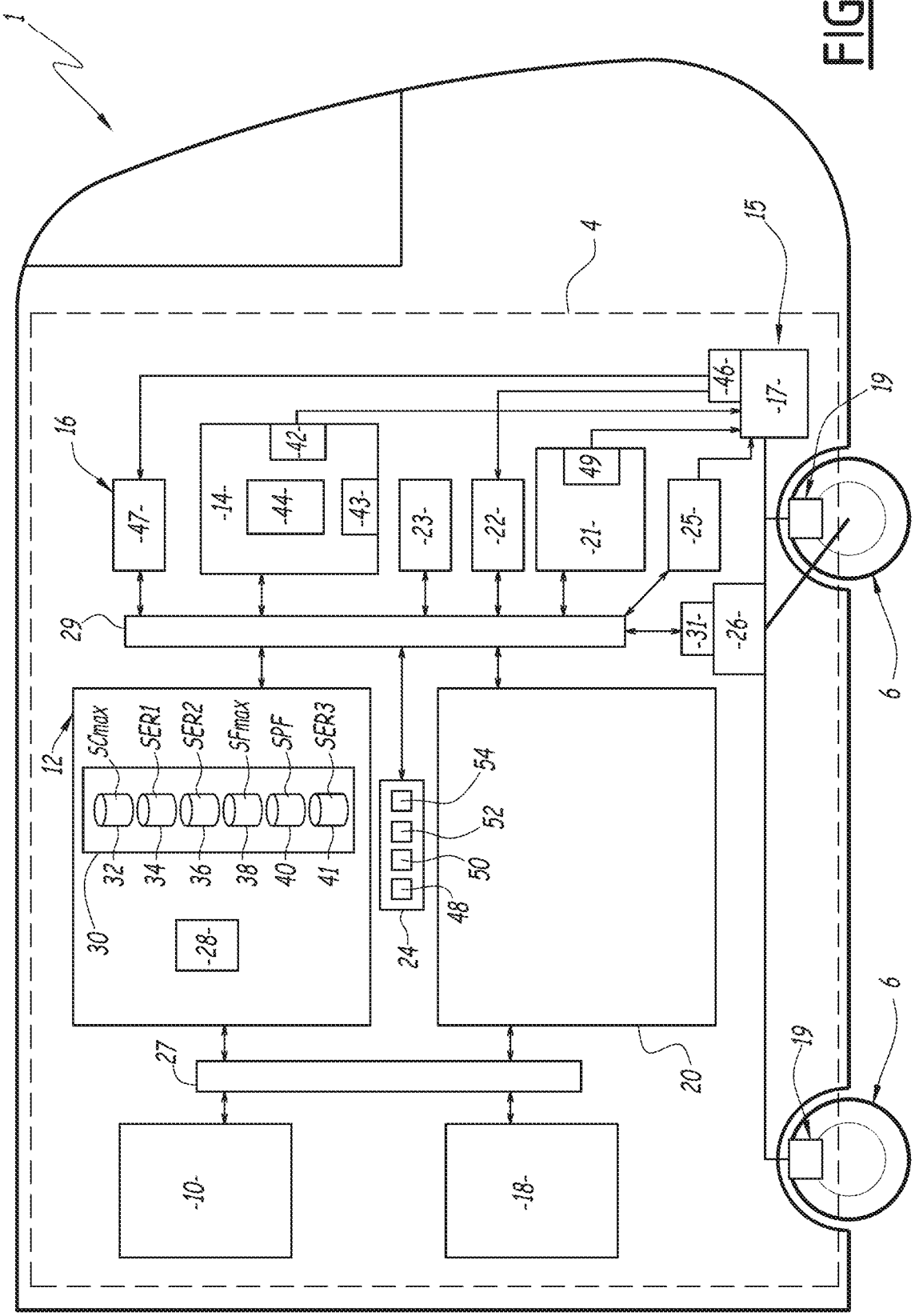
FIG. 1 is a schematic illustration of an autonomous motor vehicle comprising control equipment according to one preferred embodiment of the invention.

In FIG. 1, an autonomous motor vehicle 1 comprises control equipment 4 and wheels 6.

The control equipment 4 is capable of controlling braking of the vehicle 1 by applying a braking force on at least one of the wheels 6.

The control equipment 4 comprises a primary automatic pilot system 10, configured to generate a braking command, a primary controller 12, configured to determine a braking setpoint from the braking command, a primary actuator 14, configured to generate hydraulic pressure as a function of the braking setpoint, brake 15 comprising at least one hydraulic circuit 17 and a brake 19 able to apply a braking force on the wheel 6 as a function of the hydraulic pressure present in the hydraulic circuit, and a primary external sensor 16, for measuring the hydraulic pressure present in the hydraulic circuit 17.

The braking setpoint for example corresponds to a required braking torque. The actuator 14 is configured to convert this braking setpoint into a hydraulic pressure value.

The control equipment 4 further and preferably comprises, for safety reasons, an auxiliary automatic pilot system 18, an auxiliary controller 20, an auxiliary actuator 21 and an auxiliary external sensor 22.

The auxiliary automatic pilot system 18 is redundant with the primary automatic pilot system 10, the auxiliary controller 20 is redundant with the primary controller 12, the auxiliary actuator 21 is redundant with the primary actuator 14, and the auxiliary external sensor 22 is redundant with the primary external sensor 16.

The operation of each auxiliary device is identical or similar to the primary device with which it is redundant.

For clarity reasons, in FIG. 1, the internal structure of the auxiliary controller 20 is not shown in detail, since it is identical to the primary controller 12.

Conversely, the inner structure of the auxiliary actuator 21 is preferably different with respect to the primary actuator 14. This is described later.

During nominal operation of the control equipment 4, referred to as the nominal state, the control equipment 4 is fully operational and is not experiencing any failure.

When a failure of a device of the control equipment 4 is detected, the latter enters an auxiliary operation, called auxiliary state. In this auxiliary state, the redundant device replaces the faulty device. The auxiliary state for example implies stopping of the vehicle 1. According to one example, the other devices, not considered to be faulty, remain active and are not replaced by the redundant device as long as no failure of these devices is detected.

Furthermore, the control equipment 4 can include an inertial measurement unit (IMU), which is an electronic device that measures and/or reports, a body's specific force, angular rate, and optionally the orientation of the body, using, for example, a combination of accelerometers, gyroscopes, and optionally magnetometers. This IMU can be an external IMU 23 configured to measure an acceleration of the vehicle 1, and optionally the speed of the vehicle 1.

Additionally, the control equipment 4 preferably comprises at least one manual pilot device 24 configured to generate a manual braking command and/or a manual stop command. Such a manual pilot device 24 allows an operator either to drive the vehicle (manual pilot phase), or to regain control of the piloting of the vehicle if the operator identifies a problem (vehicle test phase).

The control equipment 4 preferably comprises a second auxiliary actuator 25 providing additional redundancy in case of failure of the actuators 14 and 21 and/or of the controllers 12, 20.

The control equipment 4 preferably comprises an electric traction motor 26 able to brake the vehicle by applying torque to the wheel 6.

In the example of FIG. 1, the systems 10, 18 and the controllers 12, 20 are connected via a data bus 27. The controllers 12, 20 and the manual pilot device 24, the actuators 14, 21, the second auxiliary actuator 25, the external sensors 16, 22, the external IMU 23 and the motor 26 are connected by a data bus 29.

In a variant, at least some of the elements of the control equipment 4 are connected to one another by direct links instead of a connection by the bus 27, 29, or by dedicated buses.

For example, in a variant that is not shown, certain elements of the control equipment 4 are connected by specific buses. For example, the controller 12 and the controller 20 are connected to the actuator 14 by a first bus, and to the actuator 21 by a second bus separate from the first bus. The controllers 12, 20 are further connected to at least part of the manual pilot device 24 by a third bus separate from the first and second buses.

Using several independent buses allows the safety of the control equipment 4 to be increased in case of failure, since it allows common failure modes to be avoided when a failure of the bus 27 or 29 occurs.

The primary automatic pilot system 10 is for example a computer comprising a memory and a processor. It is for example programmed to compute a trajectory that the vehicle 1 must follow and to generate braking commands adapted to the necessary instants.

The system 10 is connected to the primary controller 12 (and/or to the auxiliary controller 20) to transmit the braking command to the primary controller 12 (and/or to the auxiliary controller 20).

The primary controller 12 is connected to the primary actuator 14 to transmit the braking setpoint to the primary actuator 14, but also to receive an internal measurement signal from the braking actuator 14, which corresponds to a measurement of the hydraulic pressure generated by the primary actuator 14.

Additionally, the primary controller 12 is connected to the primary actuator 14 to receive a first acceleration signal corresponding to an internal measurement of an instantaneous acceleration of the vehicle 1, measured by an internal IMU, described below. The first acceleration signal comprises a negative value during the braking of the vehicle 1.

The controller 12 is further connected to the primary external sensor 16 to receive an external measurement signal corresponding to a measurement of the hydraulic pressure present in the hydraulic circuit 17.

The controller 12 is further connected to the external IMU 23 to receive a second acceleration signal corresponding to an external measurement of an instantaneous acceleration of the vehicle 1. The second acceleration signal comprises a negative value during the braking of the vehicle 1.

The controller 12 is further connected to the manual pilot device 24 to receive an electric signal corresponding to the manual braking command.

Additionally, the controller 12 is connected to the motor 26 to receive a measurement signal corresponding to a torque applied to the wheel 6 by the motor 26.

Also additionally, the controller 12 is connected, for redundancy reasons, to the auxiliary automatic pilot system 18, to the auxiliary actuator 21 and to the auxiliary external sensor 22.

The controller 12 is for example connected to the auxiliary controller 20 in order to receive a so-called "live" signal indicating the nominal operating state of the controller 20, and to transmit a "live" signal to the controller 20 in order to indicate its own nominal operation.

Preferably, the controller 12 is connected to an electrical power source (not shown) in FIG. 1, separate from an electrical power source, not shown, of the auxiliary controller 20, so as to avoid common failure modes associated with the electrical power supply.

The primary controller 12 for example comprises a processor 28 and a memory 30, having several data storage volumes, for example a first, second, third, fourth, fifth and sixth volume 32, 34, 36, 38, 40, 41.

The first volume 32 comprises values of a setpoint threshold SCmax as a function of the instantaneous speed V of the vehicle 1. The threshold SCmax gives, for a given speed, maximum authorized values of the braking setpoint sent to the actuator 14 and to the actuator 21.

"Maximum authorized value" means the maximum value in the nominal state of the control equipment 4. When the maximum authorized value is exceeded, the primary controller 12, or if applicable the auxiliary controller 20, recognizes that a failure of part of the control equipment 4 has occurred and switches to the auxiliary state.

The instantaneous speed V is the speed of the vehicle in its longitudinal direction. It is for example measured by the external IMU 23 and transmitted to the primary controller 12 and/or to the auxiliary controller 20.

The second volume 34 comprises values of a first error threshold SER1. The first error threshold SER1 is a maximum authorized value of the difference between a hydraulic pressure corresponding to the braking setpoint and the hydraulic pressure of the internal measurement signal.

The third volume 36 comprises values of a second error threshold SER2. The second error threshold SER2 is a maximum authorized value of the difference between the hydraulic pressure of the internal measurement signal and the hydraulic pressure of the external measurement signal.

The first error threshold SER1 and/or the second error threshold SER2 preferably depends on the speed V. In a variant, the first error threshold SER1 and/or the second error threshold SER2 is independent of the speed V.

The fourth volume 38 comprises values of a maximum braking threshold SFmax. This threshold is the maximum authorized value of the first acceleration signal or second acceleration signal corresponding to a measurement of the acceleration of the vehicle 1. It preferably depends on the speed V.

The fifth volume 40 comprises values of an automatic pilot threshold SPF. This threshold is a maximum authorized value of the braking command received from the primary or auxiliary automatic pilot system. It preferably depends on the speed V.

The sixth volume 41 comprises values of a third error threshold SER3, for example as a function of the instantaneous speed V of the vehicle 1. The threshold SER3 gives, for a given speed, maximum authorized values of the difference of an acceleration estimated by the controller 12 and the acceleration measured according to the first or second acceleration signal. In a variant, the threshold SER3 is a single value.

The primary actuator 14 is an electrically commanded actuator. The primary actuator 14 incorporates a servo-valve 42 capable of generating the hydraulic pressure corresponding to the braking setpoint. The primary actuator 14 further comprises an internal IMU 43 configured to generate the first acceleration signal, and an internal sensor 44 configured to generate the internal measurement signal, which corresponds to a measurement of the hydraulic pressure generated by the servo-valve 42.

The primary actuator 14 is for example a commercial off-the-shelf (COTS) product. As a result, it is not reliable enough to meet the needs of an autonomous vehicle. Although it is capable of self-diagnosing a failure, there is cause to have limited confidence in this diagnosis. This is why on the one hand an external sensor 16 is provided that is independent of the actuator 14 and that allows another measurement of the hydraulic pressure for the purposes of diagnosing the proper working of the actuator 14, and on the other hand a primary controller 12 is provided that is configured to perform this diagnosis and to detect the occurrence of a failure of the primary actuator 14, and that is preferably further configured to limit the values of the braking setpoint to within predetermined values.

The primary external sensor 16 measures the hydraulic pressure and transmits the external measurement signal to the primary controller 12.

For example, the primary external sensor 16, which may also be a COTS product, comprises a sensor 46 protruding into the hydraulic circuit 17 and electronic acquisition means 47 for acquiring the signal delivered by the sensor 46.

The auxiliary actuator 21 is identical to the primary actuator 14 except that it comprises an optional rate valve 49 in place of the servo-valve 42. The optional rate valve 49 generating the hydraulic pressure according to a predetermined mechanism allows redundancy to be obtained during the electrical control of the servo-valve 42.

For reasons of clarity, the other elements of the actuator 21, which are identical to the corresponding elements of the actuator 14, are not shown in FIG. 1. For example, the actuator 21 comprises an internal sensor that is identical to the internal sensor 44, and an IMU that is identical to the internal IMU 43.

The auxiliary actuator 21 is preferably also a COTS product.

The device 24 for example comprises a handle 48, a wheel 50/pedal 52 assembly, and/or a safety button 54.

The handle 48 and/or the wheel 50/pedal 52 assembly allow an operator to pilot and impose a steering lock angle on the vehicle 1.

The pedal 52 allows the operator to impose the manual braking command on the vehicle 1.

The safety button 54 allows the operator to impose stopping on the vehicle 1 by transmitting the manual stop command to the second auxiliary actuator 25.

The external IMU 23 is independent of the primary actuator 14. It is configured to measure the acceleration of the vehicle and to transmit the second acceleration signal to the controller 12 and/or to the controller 20.

The second auxiliary actuator 25 is configured to receive the manual stop command of the device 24 and to generate a predetermined hydraulic pressure in the hydraulic circuit 17 upon receiving this command. The "predetermined hydraulic pressure" means a noncontrollable pressure that is set by the physical properties of the actuator 25.

The second auxiliary actuator 25 is preferably connected to the device 24 by a wired connection.

The motor 26 is provided with a torque sensor 31 configured to measure the torque applied to the wheel by the motor 26, to generate the measurement signal corresponding to this torque, and to transmit it to the primary controller 12.

Method

An embodiment of the operation of the primary controller 12 will now be described. The operation of the auxiliary controller 20 is identical when it replaces the primary controller.

The primary controller 12 operates in an autonomous mode or in a manual mode.

In the autonomous mode, the primary controller 12 determines the braking setpoint as a function of the braking command. For example, the controller 12 limits the braking setpoint to the braking threshold SCmax: when the value of the braking command is less than or equal to the threshold SCmax, the setpoint is equal to the braking command; otherwise, the braking setpoint is equal to the threshold SCmax.

In the manual mode, the primary controller 12 receives the manual braking command and determines the braking setpoint as a function of this manual command. For example, the primary controller 12 limits the braking setpoint to the threshold SCmax.

In another example of the manual mode, the second auxiliary actuator 25 receives the manual stop command and triggers emergency braking by generating predetermined hydraulic pressure in the hydraulic circuit 17.

Independent of the operating mode in which it is found, the primary controller 12 can either be in a nominal state or be in an auxiliary fallback state. Hereinafter, examples of reconfiguration of the control equipment 4 when switching to an auxiliary state are described.

Failure Detection for the Primary Actuator 14 as a Function of the Braking Setpoint In order to diagnose a failure of the actuator 14, the controller 12 periodically determines a first value corresponding to the difference between the braking setpoint and the internal measurement signal done by the internal sensor 44.

For example, the controller 12 queries the volume 34 to know the value of the first error threshold SER1 in light of the instantaneous speed V. The controller 12 next compares the first value with the value of the first error threshold SER1. When the first value is greater than SER1, a failure of the actuator 14 is detected. This may for example involve a failure of the servo-valve 42 or of the internal sensor 44.

In this case, the controller 12 transmits the braking setpoint to the auxiliary actuator 21 instead of the primary actuator 14, such that it is the auxiliary actuator 21 that will henceforth generate the hydraulic pressure.

Failure Detection of the Primary External Sensor 16 or of the Internal Sensor 44

Still to diagnose a failure of the actuator 14, the controller 12 determines a second value corresponding to the difference between the internal measurement signal done by the internal sensor 44 and the external measurement signal done by the external sensor 16.

For example, the controller 12 queries the third volume 36 to know the current value of the second error threshold SER2 in light of the instantaneous speed V. It next compares the second value with the value of the second error threshold SER2. When the second value is greater than SER2, the controller 12 considers that a failure is affecting the internal sensor 44 or the primary external sensor 16, and it decides to transmit the braking setpoint to the auxiliary actuator 21 to generate the hydraulic pressure, instead of the primary actuator 14.

Failure Detection for the Primary Actuator 14 as a Function of the First or Second Acceleration Signal The primary controller 12 triggers an alert when the first acceleration signal and/or the second acceleration signal corresponds to an abnormal measurement of the acceleration of the vehicle.

For example, the controller 12 queries the fourth volume 38 to know the current value of the threshold SFmax, for example in light of the instantaneous speed V. It compares the first acceleration signal and/or the second acceleration signal with the threshold SFmax. When the internal measurement signal and/or the external measurement signal is greater than SFmax, the controller 12 considers a failure of the primary actuator 14, and/or of the external IMU 23. A failure of the actuator 14 here for example corresponds to a failure of the servo-valve 42 or of the internal IMU 43. The controller 12 considering a failure then transmits the braking setpoint to the auxiliary actuator 21 to generate the hydraulic pressure instead of the primary actuator 14, and to trigger securing of the vehicle 1.

Failure Detection for the Primary Actuator 14 as a Function of the First or Second Acceleration Signal Compared with the Braking Setpoint The controller 12 regularly monitors the coherence between the braking setpoint and the acceleration of the vehicle 1 according to the first and/or second acceleration signal.

To do this, the controller 12 calculates an estimated acceleration of the vehicle 1, from the braking setpoint and as a function of a weight of the vehicle 1 and a measured instantaneous incline of the vehicle 1. The calculation is for example done according to predetermined functions: For a given braking setpoint, the absolute value of the estimated acceleration (for the case of braking, therefore deceleration) is lower for a higher weight. Therefore, when the incline on which the vehicle 1 is descending is steeper, the absolute value of the estimated acceleration is lower.

Additionally, the controller 12 computes the estimated acceleration further as a function of the measurement signal of the torque received from the motor 26. For example, the portion of the estimated acceleration induced by the torque applied by the motor 26 simultaneously depends on this torque, the weight of the vehicle 1 and the instantaneous incline.

The controller 12 next determines the difference of the first acceleration signal and/or the second acceleration signal relative to the estimated acceleration. The queries its volume 41 to know the third error threshold SER3, and considers a failure of the primary actuator 14 and/or of the external IMU 23 when the difference exceeds the threshold SER3.

Failure Detection External IMU 23

The controller 12 computes a difference between the first acceleration signal and the second acceleration signal. When the difference is higher than a predetermined threshold, for example stored in a volume, not shown, of the memory, the controller 12 considers that the external IMU 23, the internal IMU 43 being considered to be more reliable than the latter. The controller 12 then switches to the auxiliary state, for example by securing the vehicle 1 by stopping.

Failure Detection for the Primary Controller 12 as a Function of the Braking Setpoint To diagnose a failure of the primary controller 12, the auxiliary controller 20 monitors the value of the braking setpoint determined by the primary controller 12 and, in the event of a failure of the latter, decides to replace the primary controller 12 by generating the braking setpoint and transmitting it to the actuator.

For example, the auxiliary controller 20 periodically compares the braking setpoint output by the primary controller 12 with the setpoint threshold SCmax stored in its first volume 32. If the braking setpoint is higher than SCmax, the auxiliary controller 20 considers that the primary controller 12 is faulty. The auxiliary controller 20 transmits the auxiliary setpoint to the primary actuator 14 or to the auxiliary actuator 21 to replace the braking setpoint.

Failure Detection of the Primary Controller or of the Auxiliary Controller Caused by Stopped Operation If the controller 12 does not receive the "live" signal from the controller 20, the controller 12 considers that the controller 20 is no longer operating and that redundancy of the controller has been lost. The controller 12 then enters the auxiliary state and for example stops the vehicle 1.

If the "live" signal is not received from the controller 12, the controller 20 considers that the latter is no longer operating and takes over for the controller 12.

Failure Detection for the Primary Automatic Pilot System 10

To diagnose a failure of the automatic pilot system, the controller 12 monitors the value of the braking command, and if a failure is detected, asks the auxiliary automatic pilot system 18 to replace the primary system 10.

To do this, the controller 12 queries the fifth volume 40 to know the automatic pilot threshold SPF. It compares the braking command with the threshold SPF. When the braking command is greater than SPF, the controller 12 considers the system 10 to be faulty and asks the auxiliary automatic pilot system 18 to take control of the piloting of the vehicle 1, in particular by determining an auxiliary braking command that will be taken into account in place of the braking command, to determine the braking setpoint.

Figure 2:
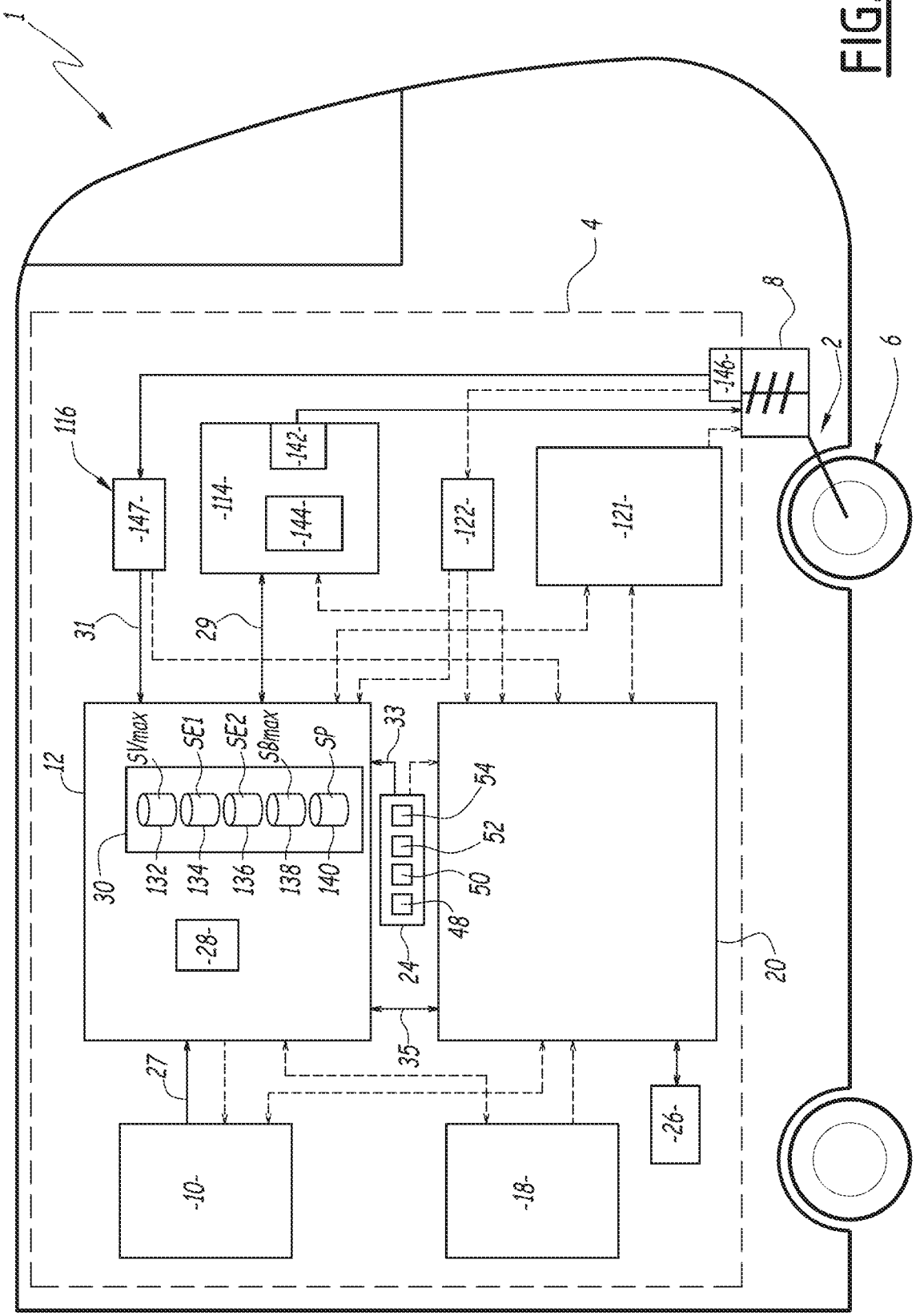
FIG. 2 is a schematic illustration of the vehicle of FIG. 1 according to an additional embodiment.

According to one embodiment illustrated by FIG. 2, the control equipment 4 is further capable of controlling a steering lock angle of the vehicle 1.

In this case, at least one of the wheels 6 is a so-called steering wheel.

The control equipment 4 further comprises a primary steering actuator, an external steering sensor, and an auxiliary steering actuator.

The primary steering actuator is configured to impart a steering lock angle to the steering wheel 6 of the vehicle 1 as a function of a steering setpoint developed by the controller 1. The primary steering actuator comprises an internal steering sensor configured to transmit, to the primary controller 12, an internal steering signal corresponding to a measurement of the steering lock angle imparted by the primary steering actuator.

The external steering sensor is configured to transmit, to the primary controller 12, an external steering signal corresponding to a measurement of the steering lock angle of the steering wheel.

The operation of the control equipment 4 according to the present embodiment is now described.

The controller 12 determines a first steering value corresponding to the difference between the steering setpoint and the internal steering signal. The controller 12 further determines a second steering value corresponding to the difference between the internal steering signal and the external steering signal.

The controller 12 next transmits the steering setpoint to the auxiliary steering actuator when the first steering value is above a first steering threshold SE1 and/or when the second steering value is above a second steering threshold SE2.

When the auxiliary steering actuator receives this steering setpoint, it then imparts a steering lock angle to the steering wheel 6 of the vehicle 1.

One can see that the control equipment 4 according to the invention and the autonomous vehicle 1 comprising the control equipment 4 have a large number of advantages.

In particular, the control equipment 4 is simple and imparts a high level of operating safety to the autonomous motor vehicle 1. The comparisons, at each instant, of the braking setpoint, the internal measurement and the external measurement constitute robust means for detecting any type of failure that may affect the primary actuator and/or the auxiliary actuator.

COTS components can therefore be used while guaranteeing the vehicle the requisite level of security for transporting passengers with complete autonomy.

The operating safety of the control equipment 4 (and therefore the vehicle) is increased by the auxiliary controller 20 and the auxiliary automatic pilot system 18, which take over in case of failure of the primary controller 12 or the primary automatic pilot system 10.

What is claimed is:

1. Control equipment configured to control braking of an autonomous motor vehicle, the vehicle including at least one wheel, the control equipment comprising:
    a braking system comprising at least a hydraulic circuit and a brake applying a braking force on the wheel as a function of a hydraulic pressure present in the hydraulic circuit;
    a primary controller, configured to determine a braking setpoint,
    a primary actuator, configured to generate said hydraulic pressure as a function of the braking setpoint when said primary actuator receives said braking setpoint, the primary actuator comprising an internal sensor configured to transmit, to the primary controller, an internal measurement signal corresponding to a measurement of the hydraulic pressure generated by the primary actuator;
    an external sensor configured to transmit, to the primary controller, an external measurement signal corresponding to a measurement of the hydraulic pressure in the hydraulic circuit; and
    an auxiliary actuator, configured to generate, as a substitute for the primary actuator, said hydraulic pressure as a function of the braking setpoint when said auxiliary actuator receives said braking setpoint,
    the primary controller being configured to determine a first error value corresponding to the difference between a hydraulic pressure corresponding to the braking setpoint and the internal measurement signal, and to determine a second error value corresponding to the difference between the internal measurement signal and the external measurement signal,
    the primary controller being configured to transmit the braking setpoint to the auxiliary actuator when the first error value is above a first error threshold and/or when the second error value is above a second error threshold,
    the control equipment being further configured to control a steering lock angle of the vehicle, the vehicle further including at least one steering wheel,
    the primary controller being configured to determine a steering setpoint, the control equipment further comprising:
    a primary steering actuator configured to impart a steering lock angle to the steering wheel of the vehicle as a function of the steering setpoint when said primary steering actuator receives said steering setpoint, the primary steering actuator comprising an internal steering sensor configured to transmit, to the primary controller, an internal steering signal corresponding to a measurement of the steering angle imparted by the primary steering actuator;
    an external steering sensor configured to transmit, to the primary controller, an external steering signal corresponding to a measurement of the steering lock angle of the steering wheel;
    an auxiliary steering actuator configured to impart a steering lock angle to the steering wheel of the vehicle when said auxiliary steering actuator receives said steering setpoint;
    the primary controller being configured to determine a first steering value corresponding to the difference between the steering setpoint and the internal steering signal, and configured to determine a second steering value corresponding to the difference between the internal steering signal and the external steering signal,
    the primary controller being configured to transmit the steering setpoint to the auxiliary steering actuator when the first steering value is above a first steering threshold and/or when the second steering value is above a second steering threshold.

2. The control equipment according to claim 1, wherein the primary actuator comprises an internal inertial measurement unit (IMU), which is configured to transmit, to the primary controller, a first acceleration signal corresponding to an internal measurement of an instantaneous acceleration of the vehicle,
    the control equipment further comprising an external IMU, independent of the primary actuator and configured to transmit, to the primary controller, a second acceleration signal corresponding to an external measurement of an instantaneous acceleration of the vehicle.

3. The control equipment according to claim 2, wherein the primary controller is configured to calculate an estimated acceleration of the vehicle as a function of the braking setpoint and of the weight of the vehicle and of the instantaneous incline of the vehicle, and to compare the first acceleration signal and/or the second acceleration signal with the estimated acceleration.

4. The control equipment according to claim 3, further comprising an electric traction motor applying instantaneous drive and/or braking torque to the wheel, the traction motor comprising a torque sensor of said motor configured to transmit a measurement signal of the instantaneous torque to the primary controller, the primary controller being configured to calculate the estimated acceleration further as a function of the measurement signal of the torque.

5. The control equipment according to claim 2, wherein the primary controller is configured to compare the first acceleration signal and/or the second acceleration signal with a maximum braking threshold, and to trigger securing of the vehicle by sending the corresponding braking setpoint to the auxiliary actuator when the first acceleration signal and/or the second acceleration signal is above the maximum braking threshold.

6. The control equipment according to claim 1, further comprising an auxiliary controller, configured to determine an auxiliary braking setpoint when the braking setpoint determined by the primary controller is above a setpoint threshold, the primary actuator or the auxiliary actuator being configured to generate the hydraulic pressure as a function of the auxiliary braking setpoint instead of the braking setpoint.

7. The control equipment according to claim 6, further comprising a primary automatic pilot system configured to generate a braking command as a function of a trajectory assigned to the vehicle, and to transmit the braking command to the primary controller, respectively to the auxiliary controller, the primary controller, respectively the auxiliary controller, determining the braking setpoint from the braking command.

8. The control equipment according to claim 7, further comprising an auxiliary automatic pilot system configured to determine an auxiliary braking command and to transmit the auxiliary braking command to the primary controller, respectively to the auxiliary controller, the primary controller, respectively the auxiliary controller, determining the braking setpoint from the auxiliary braking command.

9. The control equipment according to claim 8, wherein the primary controller is configured to take the auxiliary braking command into account in place of the braking command, when the braking command is above an automatic pilot threshold.

10. The control equipment according to claim 8, further comprising at least one manual pilot device for generating a manual braking command, the primary controller being configured to develop the braking setpoint from the manual braking command instead of the braking command or the auxiliary braking command.

11. The control equipment according to claim 10, wherein the manual pilot device is further configured to generate a manual stop command, the control equipment further comprising a second auxiliary actuator configured to trigger emergency braking of the vehicle by generating a predetermined hydraulic pressure in the hydraulic circuit upon receiving the manual stop command.

12. An autonomous motor vehicle, wherein the autonomous motor vehicle incorporates control equipment according to claim 1.

* * * * *